Jan. 11, 1966 H. B. WEISBECKER 3,229,034
EXCITER LAMP CIRCUITS
Filed May 9, 1963
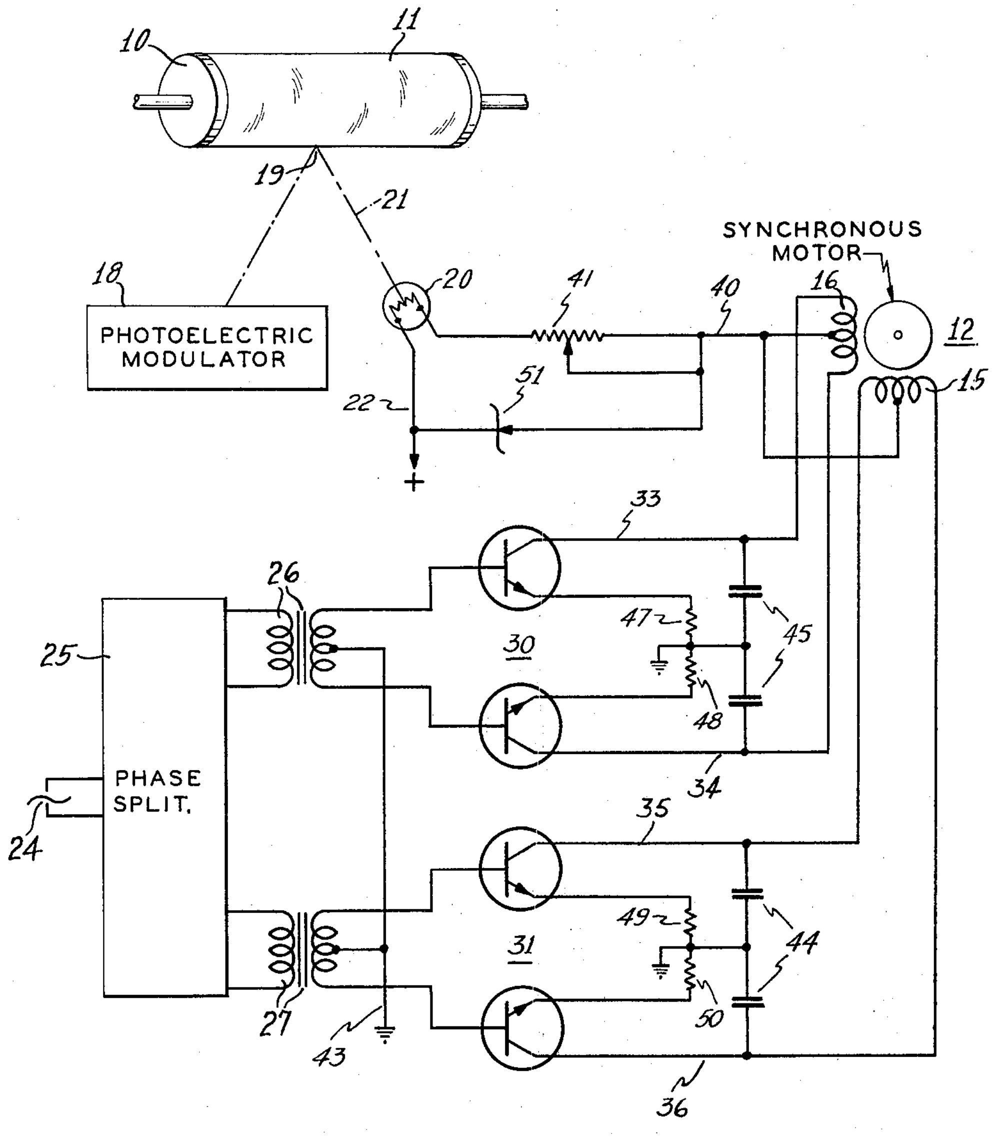
INVENTOR.
HENRY B. WEISBECKER
BY E. R. Evans
ATTORNEY United States Patent Office 3,229,034

Patented Jan. 11, 1966

3,229,034

EXCITER LAMP CIRCUITS

Henry B. Weisbecker, New York, N.Y., assignor to Litton Systems, Inc., Beverly Hills, Calif.

Filed May 9, 1963, Ser. No. 279,062
10 Claims. (Cl. 178—6)

This invention relates to an exciter lamp circuit for optical scanning systems as employed, for example, in facsimile transmitters.

An exciter lamp is required in a facsimile transmitter to illuminate the scanning area, so that the reflected light can be detected by the phototube used to convert the variations in shading of the subject copy or picture into electrical signals. This exciter lamp is frequently of the high-current, low-voltage type having a concentrated filament, the light from which may be directed upon a small scanning spot by a suitable condenser lens or reflector. A high-current, relatively massive filament minimizes flicker or light variations in the illumination of the scanning spot resulting from variations in the current supplied to the exciter lamp.

In some instances, as for example in portable equipment, a suitable source of current for the exciter lamp presents a problem. Where a small portable generator or battery is employed for energizing the motor and amplifier circuits of the transmitter, as in military field operations, the use of a dropping resistor in series with the lamp to reduce the voltage wastes considerable power. The voltage regulation of the supply may be poor. If an inverter is used to produce alternating current which can be stepped down to the desired voltage and then rectified and filtered, many extra components are required.

It is the object of the invention in general terms to provide a simple and more efficient exciter lamp circuit which eliminates the requirement for a separate battery, or a dropping resistor, or an inverter-rectifier circuit.

Another object of the invention is to provide in a facsimile transmitter or the like, having an opitcal scanning system, a circuit for energizing the exciter lamp which includes the winding of the driving motor or other power-consuming device connected to the power source or generator.

In accordance with a feature of the invention, a facsimile transmitter having a driving motor for the scanning system is provided with an exciter lamp connected in series relation with a motor amplifier and the winding or windings of the driving motor. The driving motor may be a constant-speed motor, such as a synchronous motor maintained at constant speed by a constant-frequency alternating current source such as a tuning fork oscillator. In a preferred embodiment of the invention, a, synchronous motor of the hysteresis type is employed having distributed bifilar windings arranged in split phase connection and energized by two push-pull amplifiers. The exciter lamp in this instance is connected in the common return circuit of the push-pull amplifiers, whereby a constant direct current flows through the exciter lamp. In accordance with another feature of the invention, in order to maintain the voltage across the lamp constant, a Zener diode may be connected in shunt relation to the lamp. Thus a steady current for energizing the exciter lamp is obtained without excessive power losses or the use of additional components, such as an inverter, transformer and rectifier, Other objects and advantages of the invention will appear from the following description of the illustrative embodiment thereof shown in the accompanying drawing, the single figure of which is a schematic circuit diagram of a facsimile scanning system embodying the invention.

Referring to the drawing, the facsimile transmitting or scanning system shown comprises a conventional rotatable drum or cylinder 10 on which the subject copy or picture 11 is mounted in the usual manner. The drum 10 is rotated by a driving motor 12 of the synchronous or constant-speed type. The driving motor 12 as shown comprises split-phase windings 15 and 16 in the case of a synchronous motor of the well-known hysteresis type. Each of the windings 15 and 16 of the motor 12 is a distributed bifilar winding disposed on the stator of the motor in such a manner as to cause rotation of the rotor at a speed which is fixed by the repetition rate of the current impulses alternately traversing the two halves of each bifilar winding. This type of motor is well-known in the art and is intended to represent merely one suitable form or type of synchronous or constant-speed motor that may be used in the facsimile transmitter. If desired, other types of electrical motors may be employed, particularly direct-current motors, as will be explained below. However this particular type of synchronous motor is preferred for portable facsimile equipment since it is capable of driving the copy drum 10 at constant speed in response to the pulsating energy applied to the windings by an associated amplifier. The relative movement between the subject copy and a photoelectric modulator 18 for scanning purposes is effected by the usual lead screw or in any other desired manner.

The modulator 18 is arranged in the usual manner to respond to the light reflected from the scanning spot 19 which is illuminated by an exciter lamp 20 arranged to direct a concentrated light beam 21 upon the scanning area of the subject copy. Thus the modulator 18 generates electrical signals corresponding to the shading of successive elemental areas of the subject copy as in the conventional facsimile transmitter of the drum type. The scanning system shown represents any conventional photoelectric system and forms no part of the present invention. By way of example, the modulator 18 may be similar to that disclosed in the prior patent of W. P. Asten, No. 2,430,095, dated November 4, 1947, employing a double-cathode photoelectric cell or phototube as disclosed in the prior patent of J. R. Shonnard, No. 2,459,293, dated January 18, 1949. It will be apparent that other forms of signal modulators may be employed to generate a signal varying in accordance with the variations in the shading of the subject copy or in the light reflected from any material such as a web of cloth in a scanning system used for testing the uniformity of the cloth or other material in a mill for example.

In order to illuminate the scanning spot with light of uniform and relatively high intensity, the exciter lamp 20 is frequently of the low-voltage, high-current type employing a concentrated filament. To avoid the necessity for a separate source of supply of constant voltage for the exciter lamp 20, in accordance with a feature of the invention, the lamp is connected to a D.C. source of potential which is shown as connected to the lamp through a conductor 22, and in series relation with the windings 15 and 16 of the synchronous motor 12.

In the embodiment of the invention shown by way of example, the synchronous motor 12 is energized from a constant-frequency source 24 such as a frequency-stabilized oscillator or similar source of precisely controlled frequency. A phase splitter 25 is connected to the oscillator 24 to provide input energy connections 90° out of phase with each other to a pair of coupling transformers 26 and 27 respectively. The respective quadrature voltages are impressed upon a motor amplifier which comprises separate push-pull amplifiers 30 and 31. As shown, the push-pull amplifiers 30 and 31 comprise transistors which may be NPN power transistors of the 2N1016 type, in a system in which the power source has a potential of 28 volts. The output circuits 33, 34, 35 and 36 of the push-pull amplifiers are connected to the respective terminals of the stator windings 15 and 16 of the synchronous motor 12, the common terminals of which are connected through a conductor 40 and an adjustable resistor 41 to the exciter lamp 20. A negative or ground terminal of the power supply is connected through a conductor 43 to mid-point taps on the secondary windings of the transformers 26 and 27. The motor windings 15 and 16 are shunted by tuning condensers 44 and 45 respectively. Biasing resistors 47, 48, 49 and 50 are connected to the emitter electrodes of the transistors, as shown. In case the voltage or potential of the power source fluctuates, a Zener diode 51 is connected in parallel with the lamp 20 and resitsor 41 to maintain the voltage across the lamp and resistor constant. Thus if the supply voltage rises, the diode 51 conducts the excess current resulting from the increase in voltage.

It will be seen that the exciter lamp 20, being connected in series relation with the windings of the motor 12 and the motor amplifier 30, 31, is energized at constant voltage without the additional power units and components ordinarily required, and without excessive power losses or drain on the power supply. The current which would, in any case, be required for the motor, flows through the lamp, so that the lamp is energized without any additional current being drawn from the power supply. Obviously any suitable direct-current motor or any power consuming device in the associated equipment may be substituted for the series-connected motor 12, and alternating current of a sufficiently high frequency that no objectionable flicker in the light from the exciter lamp results may be utilized to energize the lamp instead of direct current. Furthermore the regulating resistor 41 and the Zener diode 51 may be omitted from the circuit where not required.

Therefore it should be understood that the above-described arrangement is merely illustrative of the application of the underlying principles of the invention, and numerous other arrangements may be devised by those skilled in the art without departing from the spirit and scope of the invention as defined in the appended claims.

What is claimed is:

1. In a facsimile scanning system for generating signals representing subject copy, in combination,
   a photoelectric modulator,
   means for effecting relative scanning movement between the subject copy and said photoelectric modulator,
   a driving motor for said means,
   a current source for energizing said motor, and
   an exciter lamp for illuminating said subject copy connected in series relation with said current source and said motor.

2. In an optical scanning system for generating signals corresponding to variations in shading of scanned material, in combination,
   a photoelectric modulator,
   supporting means for the material to be scanned,
   means including a driving motor for effecting relative movement between said photoelectric modulator and said material or support,
   a current source,
   an exciter lamp of the filamentary type for illuminating the scanned material, and
   conductors connecting said exciter lamp and driving motor in series relation across said current source.

3. In a facsimile transmitter for generating signals by optically scanning subject copy or pictures, in combination,
   a photoelectric modulator,
   an exciter lamp for illuminating the subject copy,
   a constant-speed motor,
   means including said photoelectric modulator and said motor for scanning the copy, and
   a current source connected in series relation with said motor and said exciter lamp.

4. In a facsimile transmitter for generating signals by optically scanning subject copy or pictures, in combination,
   photoelectric means for generating signals corresponding to the variations in the shading of the subject copy,
   a rotatable drum on which the subject copy is mounted,
   a constant-speed motor for rotating said drum, and
   an exciter lamp for illuminating the subject copy connected in series relation with said motor.

5. In a facsimile transmitter for generating signals by optically scanning subject copy or pictures, in combination,
   an optical scanning system including a photoelectric modulator responsive to variations in the shading of the subject copy,
   a driving motor for said scanning system,
   a motor amplifier, and
   an exciter lamp for illuminating the scanned area of the subject copy in series relation with said motor amplifier and the windings of said driving motor.

6. In a facsimile transmitter for generating signals by optically scanning subject copy or pictures, in combination,
   a power source,
   power-consuming means for activating said facsimile transmitter connected to said power source, and
   an exciter lamp for illuminating the subject copy connected in series relation with said power source and said power-consuming means.

7. In a facsimile transmitter for generating signals by optically scanning subject copy or pictures, in combination,
   a power source,
   a driving motor for said transmitter, said motor having a stator and a winding on said stator,
   an amplifier connected to said stator winding, and
   an exciter lamp for illuminating the subject copy connected to said power source in series relation with said stator winding of the motor.

8. In a facsimile scanning system for generating signals by optically scanning subject copy or pictures, in combination,
   an optical scanning system including an exciter lamp for illuminating the subject copy,
   means for driving said scanning system,
   an electrical current amplifier having its output connected to said driving means, and
   means for connecting said exciter lamp in circuit with said amplifier.

9. In a facsimile scanning system for generating signals by optically scanning subject copy or pictures, in combination,
   an optical scanning system including an exciter lamp for illuminating the subject copy,
   an amplifier including a pair of transistors arranged in push-pull relation,
   a D.C. source for energizing said amplifier, and
   means for connecting said exciter lamp in series relation with said source and amplifier.

10. A facsimile scanning system according to claim 9, in which said amplifier includes two pairs of transistors and a synchronous driving motor is provided for the scanning system, said motor being of the split-phase hysteresis type having a pair of bifilar windings each connected to one of said pairs of transistors and to a terminal of said exciter lamp.

No references cited.

DAVID G. REDINBAUGH, *Primary Examiner.*